(12) United States Patent
Mehr et al.

(10) Patent No.: US 10,193,876 B2
(45) Date of Patent: *Jan. 29, 2019

(54) SYSTEM AND METHOD FOR VERIFYING USER SUPPLIED ITEMS ASSERTED ABOUT THE USER FOR SEARCHING

(71) Applicant: Zoosk, Inc., San Francisco, CA (US)

(72) Inventors: Alexander F. Mehr, San Francisco, CA (US); Shayan G. Zadeh, San Francisco, CA (US); Jared R. Crane, San Francisco, CA (US); Joshua D. Royse, San Francisco, CA (US)

(73) Assignee: Zoosk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,299

(22) Filed: Jul. 24, 2017

(65) Prior Publication Data
US 2017/0324723 A1    Nov. 9, 2017

Related U.S. Application Data

(63) Continuation of application No. 15/207,437, filed on Jul. 11, 2016, now Pat. No. 9,716,705, which is a continuation of application No. 14/634,831, filed on Feb. 28, 2015, now Pat. No. 9,391,974, which is a continuation of application No. PCT/US2015/001819, filed on Feb. 27, 2015.

(60) Provisional application No. 61/946,425, filed on Feb. 28, 2014.

(51) Int. Cl.
*G06K 9/00* (2006.01)
*H04L 29/06* (2006.01)
*G06F 21/32* (2013.01)

(52) U.S. Cl.
CPC .............. *H04L 63/08* (2013.01); *G06F 21/32* (2013.01); *G06K 9/00926* (2013.01); *H04L 63/0861* (2013.01)

(58) Field of Classification Search
CPC ......... H04L 63/08; H04L 63/12; G06F 21/31; G06F 21/32; G06F 21/36; G06K 9/00926; G06Q 50/01
USPC ........ 382/115, 118, 209, 218, 294; 707/723, 707/749, 783, 784
See application file for complete search history.

(56) References Cited

U.S. PATENT DOCUMENTS

| | | | |
|---|---|---|---|
| 8,532,343 B1 | 9/2013 | Freedman | |
| 8,538,065 B2 * | 9/2013 | Bladel | G06Q 50/265 382/100 |
| 2007/0124226 A1 * | 5/2007 | Garner, Jr. | G06Q 40/00 705/35 |
| 2009/0169062 A1 * | 7/2009 | Cheung | G06Q 30/02 382/115 |
| 2011/0167059 A1 * | 7/2011 | Fallah | G06Q 30/08 707/723 |
| 2012/0106805 A1 * | 5/2012 | Shuster | G06K 9/00912 382/115 |
| 2012/0136877 A1 * | 5/2012 | Zadeh | G06Q 10/06311 707/749 |

(Continued)

*Primary Examiner* — Daniel G Mariam
(74) *Attorney, Agent, or Firm* — Innovation Partners; Charles E. Gotlieb

(57) ABSTRACT

A system and method validates user supplied photographs and/or characteristics using a video, audio or series of images of the user responding to instructions, and uses such validation in searching and/or matching.

27 Claims, 3 Drawing Sheets

(56) References Cited

U.S. PATENT DOCUMENTS

2012/0259725 A1\* 10/2012 Wehmeier .............. G06Q 30/06
　　　　　　　　　　　　　　　　　　　　　705/26.4
2015/0242813 A1\* 8/2015 Conner .................. G06Q 10/10
　　　　　　　　　　　　　　　　　　　　　705/325

\* cited by examiner

SYSTEM AND METHOD FOR VERIFYING USER SUPPLIED ITEMS ASSERTED ABOUT THE USER FOR SEARCHING

RELATED APPLICATIONS

This application is a continuation of U.S. patent application Ser. No. 15/207,437 Entitled, "System and Method for Verifying User Supplied Items Asserted About the User For Searching and/or Matching" filed by Alexander F. Mehr, Shayan Zadeh, Jared R. Crane on Jul. 11, 2016, to be issued as U.S. Pat. No. 9,716,705 on Jul. 25, 2017, which is a continuation of U.S. patent application Ser. No. 14/634,831 entitled, "System and Method for Verifying User Supplied Items Asserted About the User" filed by Alexander F. Mehr, Shayan Zadeh, Jared R. Crane, and Joshua Douglas Royse on Feb. 28, 2015, to be issued as U.S. Pat. No. 9,391,974 on Jul. 12, 2016, which claims the benefit of U.S. Provisional patent application Ser. No. 61/946,425 entitled, "Method and Apparatus for Verifying User Supplied Items Asserted About the User" filed by Alexander F. Mehr, Shayan Zadeh, Jared R. Crane and Joshua Douglas Royse on Feb. 28, 2014, each having the same assignee as the present application, and each is hereby incorporated by reference in its entirety.

FIELD OF THE INVENTION

The present invention is related to computer software and hardware and more specifically to computer software for securities analysis and trading.

BACKGROUND OF THE INVENTION

Some web sites allow a user to supply items asserted to describe that user. This arrangement may be suboptimal. What is needed is a system and method that can allow items supplied by a user to be verified.

SUMMARY OF INVENTION

A system and method allows a user of a website to supply information about that user, such as descriptions of characteristics the user is asserted to possess and/or one or more photographs of that user that are asserted to represent the user's current appearance. Any such items may be displayed to that user or to other users with a symbol indicating whether they have been verified within a certain period of time. The user or a different user may request that such items not displaying such verification symbol be verified. If a different user requests the verification, the user who supplied the characteristics or photographs is alerted and requested to participate.

If the user agrees, or if the user was the user who requested verification, the user is instructed to pose or perform other actions in front of a camera that is part of, or coupled to, the user's device, while the device records a video, audio or series of images of the user who is following the instructions. The user can see the video or series of images and/or listen to the audio, and approve or retry, and if the user approves, the video, audio or series of images is uploaded to a server. A moderator views the video, audio or series of images, and the characteristic and/or photograph being verified, and indicates whether the user in the video, audio or series of images or a series of images generated from the video, appears to possess the one or more characteristics, or has the appearance of the user in the one or more photographs. The video or images may be two or three dimensional.

The moderator may be human, computer, or a combination of human and computer, for example, a computer may compare the images from the video and the photographs and suggest whether each photograph and/or characteristic should be verified, with a human approving or denying the suggestion. Human users may be employees of a web site that received the photographs and/or characteristics, a user who has requested verification of a different user's photographs, a mechanical turk participant, or other person.

The user whose photographs or characteristics were being verified is informed of the results of the verification, and the user who requested verification, if different from the user whose photographs and/or characteristics were being verified, is notified of a positive verification. When users subsequently view the photographs and/or characteristics, a symbol indicating verification of the photograph and/or characteristic is displayed near such item if the verification was successful and not older than a threshold amount of time.

In one embodiment, the characteristics that may be verified are those that are visible in the photograph, such as body style, height, presence of hair and weight, though they may not be visible in a verifiable manner.

In one embodiment, users whose photographs or characteristics are verified or users who are verified in response to a request for verification made by the user whose photographs or characteristics are ultimately verified may be shown earlier in search results than users who are not so verified, with users who request their own photographs and/or characteristics to be verified having the highest increase in position in search results (when another user searches based on characteristic matching and the like), users whose photographs or characteristics are verified in response to another user's request having the next highest increase in position in search results, and users not verified having no increase in position due to verification.

Having more or a higher percentage of photographs and/or characteristics of the user that are verified may increase the number of matches or the popularity of the other users with which the matches occur, and verifications requested by the user who supplied the photograph may have an increased effect in this regard than verifications requested by other users.

DETAILED DESCRIPTION OF A PREFERRED EMBODIMENT

Figure 1:
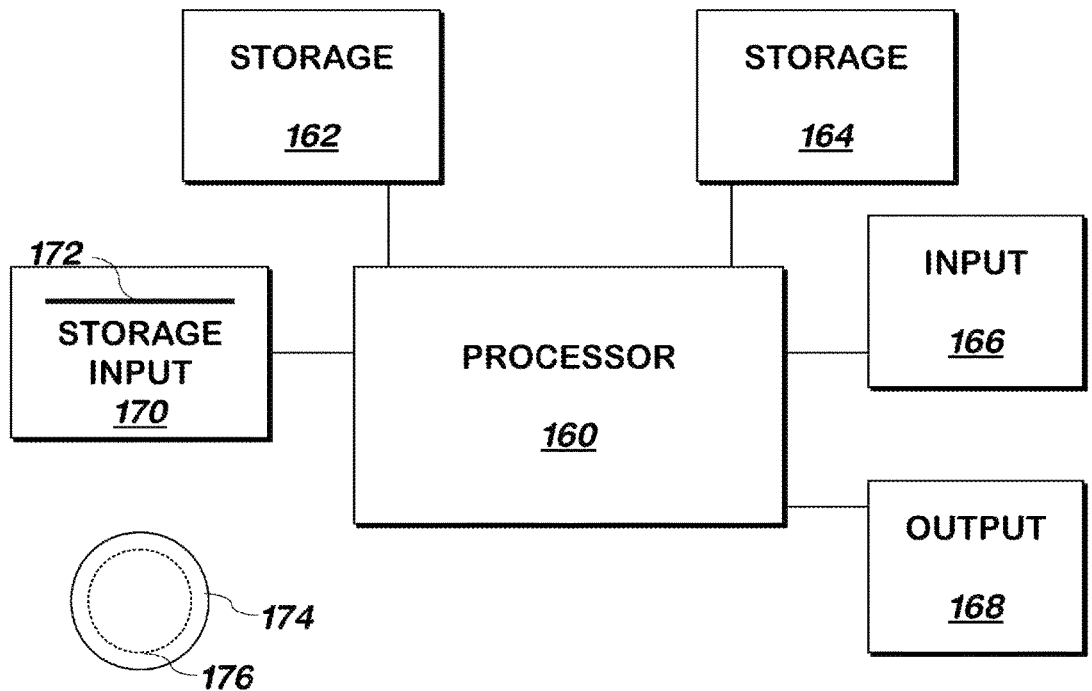
FIG. 1 is a block schematic diagram of a conventional computer system.

The present invention may be implemented as computer software, optionally in non-transitory form, running on a conventional computer system including one or more hardware processors. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164.

All storage elements described herein may include conventional memory and/or disk storage and may include a conventional database. The only "nonce word" to be used herein is the word "means": all elements of system claims not using "means for" are to be interpreted as structural. All system elements may include a conventional hardware computer processor, and may include at least one input, at least one output and at least one input/output Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Washington or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2A:
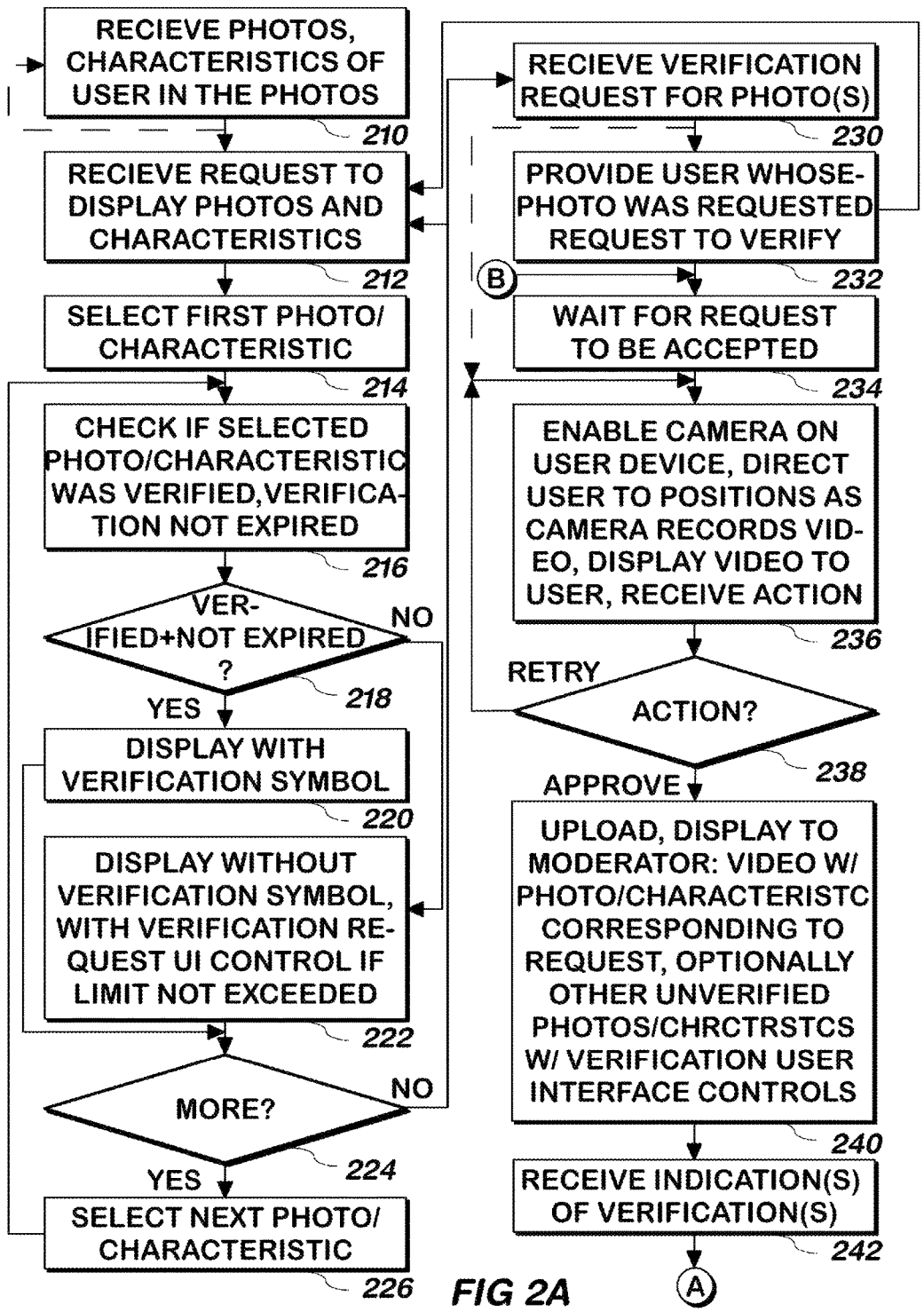
FIG. 2, consisting of FIG. 2A and FIG. 2B, is a flowchart illustrating a method of validating user-supplied items according to one embodiment of the present invention.

Referring now to FIG. 2A, a method of verifying photographs is shown according to one embodiment of the present invention. One or more photographs, and characteristics of a user supplying the photographs and, at least in some cases, in the photographs, is received 210 from a user of a website which performs the features described herein. In one embodiment, characteristics of the user supplying the photographs may include demographic information such as height, weight and sex, explanations of activities in which the user has or is willing to participate, preferences including sexual preferences, and other information about that user. The photographs and characteristics may be changed at any time as indicated by the dashed line in the Figure. Any number of different photographs and different characteristics may be received from any number of different users, and the photographs and characteristics received from one user may be different from those received from another user. Each of several photographs received from one user may be different from the other photographs supplied by that user, though a user may only supply one photograph.

A request to display one or more photographs and characteristics of one user is received from another user 212. The request may be received from a user who has performed a conventional search of the users characteristics, or by receiving a user identifier of a user, such as from a link to that user identifier supplied via a match made by a computer system that matches characteristics of the users in an attempt to find compatible users, or via a received message from the user. Any user may perform any number of the same or different searches or receive any number of different messages from the same or different users.

A first photograph or characteristic of the user corresponding to the request is selected 214. In one embodiment, as described herein, and in more detail below, each photograph and/or one or more characteristics supplied by the user may or may not be associated with a verification indication, which may include a date, such as the date the verification was performed. A check may be performed 216 to determine if the selected photograph or characteristic is associated with an indication that it was verified, and that the verification date is not older than a threshold amount of time from the current date, i.e. expired. If the selected photograph or characteristic has a verification indication indicating that it has been verified, and the verification indication is not expired, the photograph or characteristic is provided for display 218 to the user from which the request was received in step 212 with a symbol indicating that the photograph or characteristic has been verified. The method continues at step 224. If the selected photograph or characteristic was not verified, or the verification indication has expired 218, the photograph or characteristic is displayed 222, without a verification symbol, but is displayed with a user interface control that allows the user that requested the photograph or characteristic to request the verification of the photograph or characteristic.

In one embodiment, only some, but not all, characteristics can be verified, and so only those characteristics that can be verified are displayed with the user interface control that allows their verification. Such characteristics may include height, weight, body style, the presence of hair, and age.

Each time the photograph or characteristic is provided for display, the verification indication of the photograph or characteristic is used as described herein, and may change at different times causing the verification symbol to be displayed at one time and not displayed at a different time.

In one embodiment, there are limits associated with requesting verification of photographs or characteristics by a user. Such limits may include a limit on the number of users whose photographs or characteristics may be requested for verification as described herein by any single user, optionally, within a certain period of time. For example, a user may make no more than one such request, or one such request per month or per quarter. In such embodiment, the verification request user interface control will not be displayed if the user has reached the limit on the number of verification requests, although in such case, the photograph or characteristic will be displayed, though without the verification symbol if the other criteria are not met. In one embodiment, the verification request user interface control will not be displayed with a photograph or characteristic that has been previously verified within a certain period of time, i.e. is verified and the verification is not expired as described above.

If there are more photographs or characteristics 224, the next photograph of the user whose photographs and characteristics were requested is selected 226, and the method continues at step 216 using the newly selected photograph or characteristic. If there are no more photographs or characteristics 224, the method continues at step 212, and/or step 230.

At step 230, the user viewing the photographs or characteristics being displayed may request verification of any photographs that has not been verified or that has been verified, but whose verification has expired, and such request is received 230. In one embodiment, the request may be received in response to the user selecting one or more of the user interface controls described above respect step 222. The user requesting verification may be a user other than the user whose photographs or characteristics are being verified, and in another embodiment, the user whose photographs or characteristics are being verified may request verification either instead of, or in addition to, such other users. In such embodiment, if the user requests verification of one or more of his or her own photographs or characteristics, step 236 follows step 230 as indicated by the dashed line in the Figure.

In one embodiment, users whose photographs or characteristics are verified or users who are verified in response to a request for verification made by the user whose photographs or characteristics are ultimately verified may be shown earlier in search results than users who are not so verified, with users who request their own photographs and/or characteristics to be verified having the highest increase in position in search results (when another user searches based on characteristic matching and the like), users whose photographs or characteristics are verified in response to another user's request having the next highest increase in position in search results, and users not verified having no increase in position due to verification. In one embodiment, a user with two or more photographs or characteristics verified will receive a higher increase in position than a user with only one photograph or characteristic verified. In one embodiment, a user with a larger proportion of photographs and/or characteristics verified will receive a higher increase in position than a user with a lower proportion of photographs and/or characteristics verified. All such increases in position in this paragraph refer to increase in positions of search results of the user with respect to other users whose information is shown in response to a search request with the criteria for appearing in the search made at least in part from characteristics supplied by the users who show up in the results. A user who is contacted by another user who found the user in a search in which the user's position was increased based on the user's photographs having been verified as described herein could view the other user's profile and request verification of one or more photographs and/or characteristics of the other user.

Users whose photographs and/or characteristics are verified as described herein may be matched with other users more frequently or with other users who are more popular (as measured by actions many other users take with respect to such other user, such as clicking on their profile when it shows up in a list, sending messages to such other user, or replying to messages sent by such other user, or sending messages with certain content such as a positive response to a date request) than would have occurred if one or more of the user's photographs and/or characteristics were not verified. Having more or a higher percentage of photographs and/or characteristics of the user that are verified may increase the number of matches or the popularity of the other users with which the matches occur, and verifications requested by the user who supplied the photograph may have an increased effect in this regard than verifications requested by other users. A user matched in this fashion could receive a link to another user with whom the user is matched based on the user having verified photographs and/or characteristics, click on the link, and request verification of the other user's photographs and/or characteristics as described herein 258.

In one embodiment, a listing of users who match a search request is displayed with a subset of photographs and/or characteristics of each user who corresponds to the search request. The requesting user can then click on a link corresponding to any one user and a more complete set of photographs and characteristics will then be displayed. In one embodiment, even if the photographs or characteristics displayed at the first listing are not verified, a verification symbol may be displayed if the user has at least one photograph or characteristic verified, even if it not displayed at that point.

In response to the receipt of the request by a user who has not exceeded any limits on such requests, the user who supplied the photographs or characteristics for which the request for verification was made is requested to verify the photos and/or characteristics 232. The user may approve the request, or ignore the request. If the user ignores the request 234, in one embodiment, the branch of the method will wait for the request to be accepted 234.

When the user accepts the request 234, a camera and/or microphone on the user device from which the request was accepted is enabled, and the user is provided with instructions to follow while the camera is recording a video, audio file or series of images of the user following such instructions 236. As used herein a "series of images" may include a video or other similar series of images. The instructions may include pointing the camera at a certain portion of the user's body, turning the user's body (or a portion of it) in a certain direction, such as facing the camera, or performing a pose or a set of actions. As the user follows the instructions, the camera records the video or series of images and/or microphone records audio, of the user following instructions. The instructions may include those that can be used to verify the one or more characteristics for which verification was requested, for example, asking the user to stand in a doorway and show the entire doorway when a verification of a user's height characteristic is requested, or to rub the top of his head vigorously when a verification of a user's hair is requested or asking a user to repeat an English phrase in Spanish if verification of multiple languages is requested. The instructions may include those which make it easy to verify the person in the video is the same person in the photographs, for example, by displaying a photograph to the user and asking the user to appear in the video in the same position and distance relative to the camera as the user is in the photograph, and optionally repeating this process for each photograph being verified.

In one embodiment, the user may select any of the photographs and indicate that the user is not in the photograph, or point to one of several people in the photograph to indicate which person in the photograph is the user. If the user indicates that the user is not in the photograph, the photograph is not verified in one embodiment. The indication that the user is not in the photograph, or the location of the user among other people in the photograph may be stored associated with the photograph, such information may be displayed with subsequent display of the photograph, and any location information may be used to verify the photograph as described below.

In one embodiment, the video may instead be substituted with any series of multiple images, such as 3D images. The video may be a 3D video.

After the instructions are complete, the video, audio and/or images of the user following the instructions is displayed to the user as part of step 236 and the user may perform one of two actions: accept the video, or request to retry. If the user requests to retry 238, the method continues at step 236. In one embodiment, if the user requests to retry, the instructions provided in a subsequent trial will not be or may not be exactly the same as the instructions provided in any prior try of step 236.

If the user approves the video, audio or series of images 238, the video (including audio or separate audio) or series of images is uploaded from the user device to a different one or more computer system on which the video, or a series of images from the video, may be viewed or processed by a moderator, and the video, or a series of images from the video, are displayed to the moderator with the photographs of the user 240. In one embodiment, all photographs received from the user are displayed to, or processed by, the moderator with the video, audio or series of images, and in another embodiment only photographs not previously verified and those whose verifications have expired are displayed to, or processed by, the moderator with the video, audio or series of images, and in another embodiment only the photograph selected by the user are displayed to, or processed by, the moderator with the video. In one embodiment, the uploaded video is converted into a series of images at step 240. In one embodiment, the display of the video, audio or series of images and the one or more photographs or characteristics is made additionally with a user interface control that allows the moderator to accept or decline to verify that the person in the one or more photographs and the person in the video appear to be the same person or the person in the video has the characteristics being verified 240. The moderator uses one or the other control to indicate that the one or more photographs are verified or not verified in such indication is received 242. In one embodiment, verification of photographs is made if the user follows the instructions in the video and appears to look like a person in the photos, and verification of characteristics is made if the user appears to have one or more of the characteristics supplied by that user (e.g. an athletic body style or correctly speaks a language indicated as spoken by that user).

In one embodiment, conventional image or speech recognition techniques may be used to identify via a computer whether the user in the video, audio or series of images appears to have followed the instructions, and so the moderator may be, at least in part, a computer system. In one embodiment, conventional facial recognition techniques may be used to identify via a computer whether the user in the video or series of images matches a user in the photographs. The computer performing these recognition techniques may, based upon their outcome, provide a suggestion to the moderator as to whether or not to verify the photos, or either a verification or no verification suggestion of the computer may be used as if it were the human moderator's determination, with only the other determination being routed to a human moderator for verification. In one embodiment, only a computer is used as the moderator, with humans occasionally checking the moderator's decisions.

In one embodiment, conventional image or speech recognition techniques may be used to identify (or the moderator may also verify the user subject to) whether the user in the video appears to have characteristics that match some of the characteristics the user has specified, for example determining if the user has hair or has a body style identified in the characteristics.

In one embodiment, conventional image recognition techniques may be used to identify the user's height, for example, when the user follows instructions to stand in a doorway or hold a basketball. The size of a standard doorway or basketball may be identified, and the image of it recognized in the video or series of images and used to identify the height of the user by proportion.

A human moderator may be supplied via mechanical turk, which is an online marketplace for short term work, or from other users who supply photos and/or characteristics as described above. Other users may be motivated to perform the tasks of a moderator because they are given credits on the web site on which the verification requests are received. Credits may be used to obtain other features of the web site or may be required to make a verification request, or to have it carried out. In such embodiment, a user may be required to have acted as a moderator for at least three user's images before that user's verification request is accepted or carried out.

One or more human moderators may always be supplied if the characteristic being verified requires a subjective determination, such as whether the person in the video, audio or series of images can sing or dance.

Figure 2B:
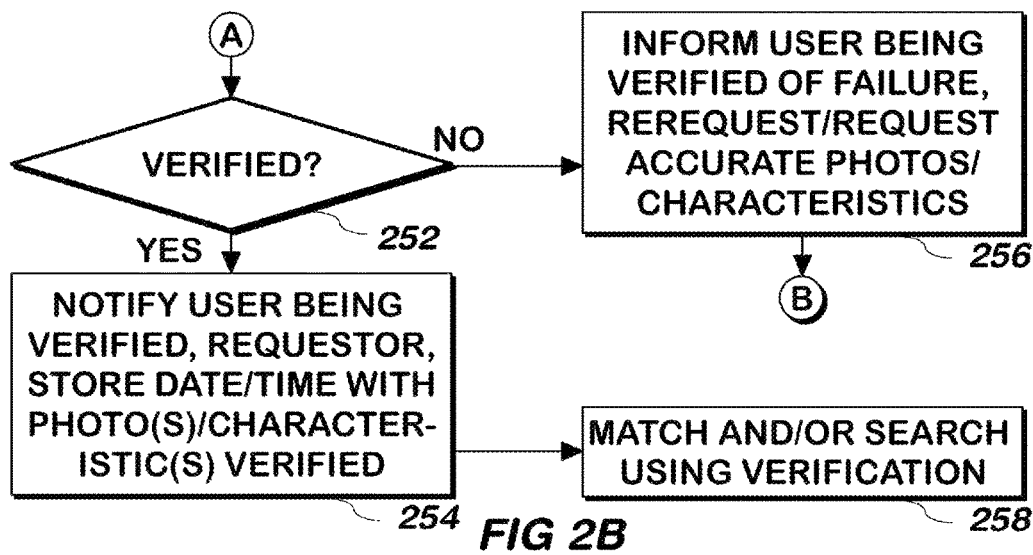

The method continues at step 252 of FIG. 2B.

In one embodiment, when a decision about verification of the photographs and/or characteristics has been made, either by a computer system or a moderator, the video, audio or series of images for the verification is deleted, optionally after a delay to allow for an appeal process, whereby the user may appeal the decision, optionally with additional information, and the video, audio or series of images is reused to repeat the verification process described herein. The user may be informed of the deletion prior to submitting the video, audio or series of images so that the user may be motivated to perform certain actions in the video that he or she may be inhibited from performing if the user knew the video, audio or series of images would not be deleted after use.

At step 252, if the user in the video, audio or series of images and the photographs and/or characteristics is verified, the user verified is notified that the verification process was successful, and the requester of the verification is also similarly notified 254. As part of step 254, the date and time of verification is stored associated with the photographs and/or characteristics verified, for use at the next display of the photographs and/or characteristics, as described herein.

In one embodiment, verification user-interface controls of step 240 are provided on a photograph by photograph, or characteristic by characteristic basis, to allow the moderator to verify only some, but not all, the photographs and/or characteristics as described herein. In such embodiments, the notifications of step 254 indicate which photographs were verified, and the date and time is stored only with the one or more photographs or characteristics that were verified, but not with the other photographs or characteristics from the same user. If the indication received from moderator is not to verify one or more photographs or characteristics 252, the user whose photographs are being verified is informed of the failure of the verification 256, and the user is requested to re-perform the video, audio or series of images and instructions technique of step 236, or provide more accurate photographs and/or characteristics in step 210, and potentially remove the one or more photographs that were not verified or change the characteristic or characteristics not verified. The method continues at step 234, waiting for the new request to be accepted.

In one embodiment, verification of one or more photographs or characteristics is performed via a majority vote of three or more moderators who have viewed the video and seen the one or more photographs and/or characteristics being verified, instead of using a single moderator. If the majority votes against verification of a photo or characteristic, that photo or characteristic is not verified.

Once a user's photographs and/or characteristics have been verified, the next time a different user requests the display of photographs and characteristics of that user, the verification symbol of step 222 is displayed with the verified photographs and characteristics.

In one embodiment, if a verification request is received for one or more photographs and/or characteristics in step 230, such request is associated with the one or more photographs and/or characteristics, and an indication that verification of each photograph or characteristic is pending is displayed in step 222 with the one or more photographs and/or characteristics for which verification was requested but not successfully received, optionally with the date of the request.

As used herein, the term "upharacteristic" means a user supplied characteristic value (such as height, weight, body style, presence of hair, etc.) or photograph that is intended to represent the user who supplied it to other users of a service.

System

Figure 3:
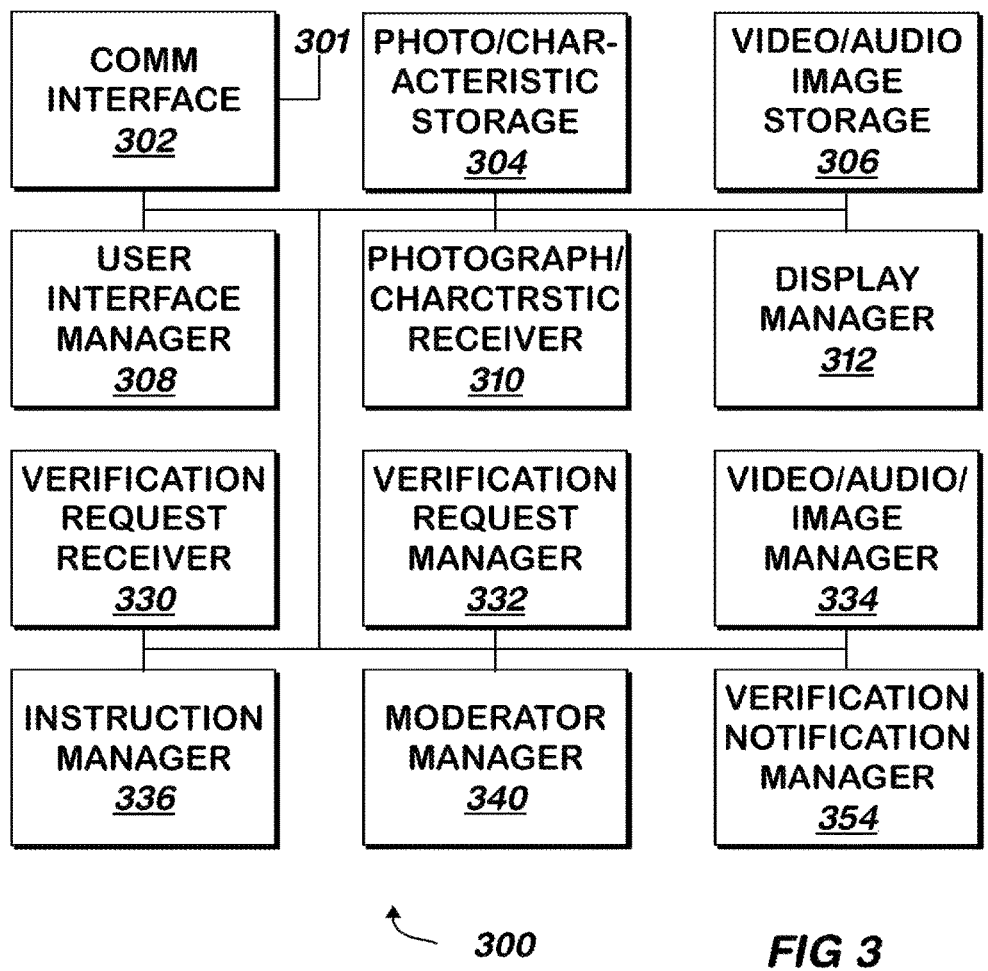
FIG. 3 is a block schematic diagram of a system for validating user-supplied items according to one embodiment of the present invention.

Referring now to FIG. 3, a system 300 for verifying and displaying user-supplied photographs and/or characteristics is shown according to one embodiment of the present invention.

Communication interface 302 includes a conventional communication interface coupled to a network such as an Ethernet network, the Internet or both, via input/output 301. Communication interface 302 runs suitable communications protocols, such as TCP/IP, Ethernet or both. Unless otherwise specified, all communication with the system of FIG. 3 is made via communication interface 302.

A user may log into the system of FIG. 3 using user interface manager 308, which supplies a user interface to receive a user identifier and password, authenticates the user using conventional techniques against a username and password previously stored into photograph/characteristic storage 304, issues a unique session identifier to the user, and stores such session identifier into photograph/characteristic storage 304 associated with the user identifier, and also stores the session identifier onto a device from which the user is communicating to the system of FIG. 3 via a conventional cookie or secure storage file, or other similar technique. Unless otherwise specified, other elements of FIG. 3 numbered 308 or higher reads such identifier, locates it in photograph/characteristic storage 304 and obtains the user identifier from it as needed as they perform the functions described below.

When the user has authenticated himself or herself to user interface manager 308, user interface manager 308 supplies user interface elements such as via one or more links that allow a user to supply photographs and/or characteristics as described herein, search for users, view messages from users, or view their own supplied photographs and/or characteristics. If the user selects the user interface element to supply photographs and/or characteristics, the user interface element signals photograph/characteristic receiver 310.

Supply Photographs and/or Characteristics

When signaled, photograph/characteristic receiver 310 receives from each of the several users of a web site, photographs that include images of that user, and characteristics describing that user. Photograph/characteristic receiver 310 stores such photographs and/or characteristics into photograph/characteristic storage 304, associated with the identifier of the user that supplied such photograph, along with a unique serial number it issues for each photograph.

View Messages

If the user requests to view messages, user interface manager 308 provides a user interface to allow the user to see messages sent to that user. Each message may be listed with the message header as a link in a list of messages, and when the user clicks a link, user interface manager 308 displays the message corresponding to the link and a username of the user who sent the message, as a link. Such messages may have been sent using any conventional messaging method. If the user clicks the link corresponding to the user who sent the message, photograph/characteristic display manager 312 is signaled with the identifier of the user, such information having been embedded in the link.

Search

If the user requests to perform a search, user-interface manager 308 provides a user interface to allow the user to provide search parameters, such as values or ranges of values of characteristics with which to perform the search. User-interface manager 308 receives such parameters, searches for other users corresponding to the search parameters using information from such other users stored in photograph/characteristic storage 304. User-interface manager 308 displays a list of such users that correspond to the user's search, and may include one or more photos, and a subset of the characteristics that such user has provided and are stored in photograph/characteristic storage 304. Each user in the list may be displayed as a link, and when the user selects one such link, photograph/characteristic display manager 312 is signaled with the identifier of the user, such information being embedded in the link.

View User's Own Photographs and Characteristics

If the user requests to view the user's own photographs and characteristics, operating the user interface element such as the link signals photograph/characteristic display manager 312 with the user identifier of that user.

View Photograph and/or Characteristics of a User

When signaled with the identifier of the user, photograph/characteristic display manager 312 displays the photographs and characteristics associated with the user corresponding to the identifier it receives, such photographs and characteristics being stored in photograph/characteristic storage 304. Each photograph, and/or each of some of the characteristics, is associated in photograph/characteristic storage 304 with a verification indication that indicates whether the photographs or characteristics have been verified as described herein. Each such photograph and/or characteristic associated with a verification indication that is not expired as described above is displayed by photograph/characteristic display manager 312 with a verification symbol indicating that the photograph or characteristic was verified as described herein.

Photographs and/or characteristics that may be verified, and that are not associated with an unexpired verification indication indicating that the photograph or characteristic has been verified within a threshold amount of time, are displayed by photograph/characteristic display manager 312 with a user interface control that allows the user to request verification of the photograph and/or characteristic. For example, the user interface control may be a check box, and the user may check boxes displayed with each photograph and/or characteristic the user wishes to have verified as described herein, and then press a submit button that was also provided by photograph/characteristic display manager 312.

In one embodiment, limits as to the number of requests for verification a user may make are enforced by photograph/characteristic display manager 312 as described above, using the information associated with the requests received that is stored in photograph/characteristic storage 304. Photograph/characteristic display manager 312 enforces such limits by not displaying the user interface controls to a user who has exceeded such limit. In on embodiment, a user's request to verify his or her own photograph and/or characteristic is not counted against such limits.

Receive Request to Verify

When the user presses the submit button, it signals verification request receiver 330 with an indication of the check boxes or other user interface controls that the user had selected for verifying the corresponding photographs and/or characteristics, and the user identifier of the user that had supplied the photographs and/or characteristics.

When it receives such information, verification request receiver 330 issues a unique serial number to the verification request, and stores into photograph/characteristic storage 304 with the unique serial number, the date and time, the identifiers of the photographs, indices of the characteristics, or both for which verification was requested, and the user identifier of the requesting user and the user identifier of the user who provided such photographs and/or characteristics.

Verification request receiver 330 identifies whether the verification request came from the user who had supplied the photographs and/or characteristics, or from a different user, for example by using the cookie or secure storage information to identify the user who made the request, and compare it to the user identifier of the user that supplied such photograph or characteristic. If the verification request came from a different user, verification request receiver 330 provides the information it received to verification request manager 332. If not, verification request receiver 330 signals video/audio/image manager 334 with the verification request serial number.

Ask User who Supplies the Photographs/Characteristics to Verify

When it receives such information, verification request manager 332 provides a conventional message to the user who supplied the photographs or characteristics to be verified, with a link to video/audio/image manager 334 that contains the verification request serial number. In one embodiment, verification request manager 332 instructs the user to click on the link it provides when the user is at a device coupled to, or attached to, a camera. When the user reviews the message, if the user clicks the link, video/audio/image manager 334 is signaled with the verification request serial number.

Provide Instructions and Record Video/Images

When signaled with the verification request serial number, video/audio/image manager 334 enables a camera and/or microphone on, or attached to, the user device (not shown) or other device, provides instructions as described herein, and causes the user's device to record a video, audio, or other series of images of the user as described above. In one embodiment, instructions are selected from a database of instructions that are stored in video/audio/image storage 306. In one embodiment, certain instructions correspond to individual characteristics that may be verified, and the instructions selected by video/audio/image manager 334 from the database in video/audio/image storage 306 are selected in response to the characteristics that were requested to be verified, as indicated with the verification request information corresponding to the verification request serial numbers stored in photograph/characteristic storage 304. In one embodiment, as video/audio/image manager 334 provides instructions, it may also display to the user one or more of that user's photographs being verified, and request the user to position the user's body relative to the camera in the same position the user was in when the photograph being presented to that user was taken. In one embodiment, video/audio/image manager 334 supplies a user interface to allow the user to indicate the user's location in the photograph, for example to distinguish the user from other people in the photograph if video/audio/image manager 334 detects multiple people in the photograph using conventional detection techniques. Video/audio/image manager 334 stores the position of the user into photograph/characteristic storage 304, associated with the identifier of the photograph. The user's location in the photograph may be used to verify the user as described herein, and may be displayed by display manager 312 when the user or other users subsequently have the photograph displayed as described herein. In one embodiment, video/audio/image manager 334 may reside partially in a server and partially on the user's device, or all in one or the other, or both, as any of the other elements of FIG. 3 can.

Allow User to Approve Video/Images or Retry

After video/audio/image manager 334 has completed providing instructions, video/audio/image manager 334 stops the user's device from recording additional video, audio or images, and displays the images, or plays back the video and/or audio, to the user on the user's device. Video/audio/image manager 334 displays a user interface to allow the user to accept the video, audio or set of images, or to retry with a different video, audio or set of images.

If the user uses the user interface to retry, video/audio/image manager 334 causes the video, audio or set of images recorded to be discarded, and repeats the process of providing instructions and recording a video, audio or series of images as described above. As noted, the instructions at a subsequent try may be different than the ones provided at the previous try or all prior tries from the same user for the same verification serial number. In such embodiment, there may be multiple instructions stored in the database of instructions in video/audio/image storage 306 for each characteristic that can be verified, with a different one or more such instructions for each characteristic being selected at each retry. In one embodiment, video/audio/image manager 334 stores the identifier of the photograph or an index of the characteristic to which the instructions correspond together with the time relative to the start of the video, or an identifier of the image captured around such time, that such instructions were given. Such information is stored associated with the request serial number in photograph/characteristic storage 304.

Upload Video/Images When Approved

If the user uses the user interface to accept the video, audio or series of images, video/audio/image manager 334 uploads the video, audio or series of images to video/audio/ image storage 306 and associates the video, audio or series of images with the verification request serial number it received, and signals moderator manager 340 with that serial number.

Verify Photograph/Characteristic Using Video/Images

When it receives the serial number, moderator manager 340 locates the information associated with the serial number stored in photograph/characteristic storage 304, identifies the user from which the photographs and/or characteristics being verified were received, and identifies such photographs and/or characteristics in photograph/characteristic storage 304. Moderator manager 340 uses the video, audio or images associated with the serial number in video/audio/image storage 306 to display to a moderator the video or the series of images and/or provide the audio, together with the photograph or characteristic that corresponds to the point in time of the video, audio or the image in the series of images, using the timing or image correspondence information described above, that is stored in photograph/characteristic storage 304.

Moderator manager 340 provides user interface elements with each characteristic and/or photograph being verified, to allow the moderator to indicate whether or not to verify each such photograph and/or characteristic as described above. Moderator manager 340 stores the indication as to whether the moderator verified or did not verify each characteristic and/or photograph in photograph/characteristic storage 304 for each photograph or characteristic being verified, associated with such photograph or characteristic. In one embodiment, moderator manager 340 stores the date and time of the verification with the indication that the photograph and/or characteristic has been verified into photograph/characteristic storage 304 associated with the identifier of the photograph or index of the characteristic verified, optionally with an indication as to whether the information associated with the verification serial number indicates that the user who requested verification is the same user as the user who supplied the photograph or the characteristic. After all photographs and/or characteristics corresponding to the verification request have been verified in this manner, moderator manager 340 provides the verification serial number to verification notification manager 354, and in one embodiment, deletes the video or series of images, in one embodiment, after a delay period (e.g. 1 day) to allow the verification using the same video, audio or series of images.

In one embodiment, moderator manager 340 uses the techniques described above to automatically provide verification suggestions to the moderator as to whether the photograph or characteristic should or should not be verified to the moderator with each photograph and/or characteristic it displays. In another embodiment, the suggestions of moderator manager 340 are assumed always taken by the moderator (and stored as if the moderator had verified or not verified each photograph or characteristic as described above), without any user input of the moderator, except that in one embodiment, occasionally moderator manager 340 provides suggestions, which the moderator must take action to accept or reject in order to verify or not verify the photograph or characteristic. In one embodiment, moderator manager 340 identifies a confidence score with each suggestion it provides, with a higher confidence score indicating more confidence in the suggestion. In such embodiment, suggestions with a confidence score above a threshold are automatically treated as if they were taken by a moderator by moderator manager 340 without user input, and otherwise suggestions are displayed to a human moderator with the user interface controls described above to allow the moderator to verify or not verify the photograph or characteristic.

Notify User Who Supplied Photographs/Characteristics

When verification notification manager 354 receives the verification serial number, it looks up the identifier of the user who supplied the photographs and/or characteristics for which the at least the attempt at verification was made, determines if all of the photographs and/or characteristics being verified corresponding to the verification serial number were verified using the information in photograph/characteristic storage 304 as described herein, and notifies that user (e.g. via a conventional message such as an e-mail message) whether the verification succeeded. If the verification did not succeed, verification notification manager 354 provides the same link to video/audio/image manager 334 with the verification serial number as described above (except that in one embodiment, the link contains embedded information such as REST information that informs video/audio/image manager 344 that this is a retry) and suggests that the user replace the photos and/or characteristics with those that are more accurate and retry the verification process, or retry the verification process in a manner that makes verification more likely, such as using brighter light for the video or images or other suggestions. In one embodiment, if the user subsequently deletes one or more photographs for which verification was requested but not verified and adds one or more other photographs, if the user clicks the link above, video/audio/image manager 344 will add the identifiers of any new photographs with the identifiers of the photographs in photograph/characteristic storage 304 that correspond to the verification serial number it received, and deletes from photograph/characteristic storage 304 identifiers of photographs associated with the verification serial number it received, but for which the photographs were deleted. The process described herein is then repeated and performed using the verification serial number for photographs and/or characteristics that were not verified within the threshold amount of time.

Notify User who Requested Verification if Different

Verification notification manager 354 additionally checks the user identifiers associated with the verification serial number it receives. If the user identifiers are different, verification notification manager 354 sends a message such as an e-mail message identifying the one or more photographs and/or characteristics verified to the user who requested the verification.

In one embodiment, unless all photographs and/or characteristics for which verification was requested are verified, verification notification manager 354 waits a period of time such as one day before notifying the user who requested verification to allow the user being verified to retry the verification process or change the photographs and/or characteristic values and retry the verification process. In such embodiment, verification notification manager 354 notifies the user who requested verification of all photographs and/or characteristics verified, and optionally indicates which photographs and/or characteristics were replaced and then successfully verified, using the information associated with the verification serial number in photograph/characteristic storage 304.

Subsequent Views of the Photographs and/or Characteristics may have Updated Symbols When photograph/characteristic display manager 312 subsequently displays the photographs and characteristics, it uses the information in photograph/characteristic storage 304 to display them with the symbols described above, indicating whether the photographs or characteristics have been verified, and/or whether a verification request was made and the date of that request.

In one embodiment, if any photographs or characteristics of a user are verified, when the user's identifier is displayed to any user by user interface manager 308, user interface manager 308 will also display one or more symbols indicating that at least one such photograph and/or one such characteristic of that user are verified, even user interface manager 308 is not presently displaying a verified photograph or characteristic, so that the user viewing such information may determine which users to investigate more fully.

In one embodiment, the position of a user in search results listed by user interface manager 308 is altered to be higher up than it would otherwise be, if any of the photographs and/or characteristics of that user have been verified, as described above.

In one embodiment, user interface manager 308 matches users using their characteristics, and sends one or both matched user a message that indicates the other user with which that user was matched. In one embodiment, a user who has a threshold amount or percentage of photographs and/or characteristics verified as described herein will be matched with more users or only with users who also have a threshold amount of photographs and/or characteristics verified, by user interface manager 308.

Summary

Described is a method of verifying registration information, including: receiving information about a user of a website, including purported characteristics of the user of the web site for display to other users of the web site, and/or at least one photograph purported to represent the user of the web site for display to other users of the web site; providing at least one instruction to the user of the web site requesting the user to pose in a certain manner while causing at least one image to be recorded of the user posing in the manner; receiving the series of images recorded, either simultaneously with their recording or thereafter; providing the series of images to a moderator and at least one of the purported characteristics and/or at least one of the at least one photograph from the information about the user of the web site; receiving an indication from the moderator whether the series of images of the user at least correspond to the at least one of the purported characteristics and/or the at least one of the at least one photograph provided to the moderator; and providing data for rendering to other users of the web site a human-perceptible indication that the at least one of the purported characteristics and/or at least one of the at least one photograph of the information about the user of the web site have been verified, responsive to the indication received.

The method optionally includes a feature whereby at least a portion of the moderator comprises a human moderator.

The method optionally includes a feature whereby the at least one of the purported characteristics and/or the at least one of the at least one photograph comprises the at least one of the purported characteristic.

The method optionally includes a feature whereby the at least one of the purported characteristics and/or the at least one of the at least one photograph comprises the at least one photograph.

The method optionally includes a feature whereby the at least one instruction to the user of the web site is provided in response to a request received from the user of the web site.

The method optionally includes a feature whereby the at least one instruction to the user of the web site is provided in response to a request received from another user of the web site, different from the user of the web site.

The method may additionally include: providing for display to the user of the web site, the series of images; and receiving from the user an approval of the series of images; and optionally includes a feature whereby the providing data for rendering to other users step is responsive to the approval of the series of images received.

The method optionally includes a feature whereby the providing data for rendering to other users step is responsive to an amount of time between: the providing data for rendering to other users step; and the receiving the series of images step or the receiving the indication step.

Described is a system of verifying registration information, including: a photograph/characteristic receiver having an input for receiving information about a user of a website, including purported characteristics of the user of the web site for display to other users of the web site, and/or at least one photograph purported to represent the user of the web site for display to other users of the web site, the photograph/characteristic receiver for providing at an output the information about the user of the web site; an instruction manager having an output for providing at least one instruction to the user of the web site requesting the user to pose in a certain manner while causing via the instruction manager output at least one image to be recorded of the user posing in the manner; a video/audio/image manager having an input for receiving the series of images recorded, either simultaneously with their recording or thereafter, the video/audio/image manager for providing at an output the series of images recorded; a moderator manager having an input coupled to the video/audio/image manager for receiving the series of images recorded, and to the photograph/characteristic receiver output for receiving the information about the user of the web site, the moderator manager for providing at an output the series of images for display to a moderator and at least one of the purported characteristics and/or at least one of the at least one photograph from the information about the user of the web site, for receiving from the moderator at the moderator manager input an indication whether the series of images of the user at least correspond to the at least one of the purported characteristics and/or the at least one of the at least one photograph provided to the moderator, and for providing at the moderator manager output the indication; and a photograph/characteristic display manager having an input coupled to the moderator manager output for receiving the indication and to the photograph/characteristic output for receiving the information about the user of the web site, the photograph/characteristic display manager for providing data for rendering to other users of the web site a human-perceptible indication that the at least one of the purported characteristics and/or at least one of the at least one photograph from the information about the user of the web site have been verified, responsive to the indication received at the photograph/characteristic display manager input.

The system optionally includes a feature whereby at least a portion of the moderator comprises a human moderator.

The system optionally includes a feature whereby the at least one of the purported characteristics and/or the at least one of the at least one photograph comprises the at least one of the purported characteristic.

The system optionally includes a feature whereby the at least one of the purported characteristics and/or the at least one of the at least one photograph comprises the at least one photograph.

The system may additionally include a verification request manager having an input coupled to receive a verification request from the user of the web site, the verification request manager for providing at an output a signal responsive to receipt of the verification request; and optionally includes a feature whereby: the instruction manager input is additionally coupled to the verification request manager output for receiving the signal; and the at least one instruction to the user of the web site is provided by the instruction manager in response to the signal received at the instruction manager input.

The system may additionally include a verification request manager having an input coupled to receive from another user of the web site, different from the user of the web site, a verification request specifying the user of the web site, the verification request manager for providing at an output a signal identifying the user of the web site responsive to receipt of the verification request; and optionally includes a feature whereby: the instruction manager input is additionally coupled to the verification request manager output for receiving the signal; and the at least one instruction to the user of the web site is provided by the instruction manager in response to the signal received at the instruction manager input.

The system optionally includes a feature whereby: the video/audio/image manager is additionally for: providing via the video/audio/image manager output for display to the user of the web site, the series of images; and receiving from the user via the video/audio/image manager input an approval of the series of images; and the photograph/characteristic display manager provides data for rendering to other users responsive to the approval of the series of images received.

The system optionally includes a feature whereby: the moderator manager additionally provides at the moderator manager output an first identification of substantially when the indication was received and/or the video/audio/image manager additionally provides at the video/audio/image manager output a second identification of substantially when the series of images was received; the photograph/characteristic display manager input is additionally for receiving the first identification and/or is additionally coupled to the video/audio/image manager output for receiving the second identification; the photograph/characteristic display manager provides data for rendering to other users responsive to an amount of time between: a time or day near or when the photograph/characteristic display manager provides the data for rendering to other users; and the first and/or second identifications.

Described is a computer program product including a computer useable medium having computer readable program code embodied therein for verifying registration information, the computer program product including computer readable program code devices configured to cause a computer system to: receive information about a user of a website, including purported characteristics of the user of the web site for display to other users of the web site, and/or at least one photograph purported to represent the user of the web site for display to other users of the web site; provide at least one instruction to the user of the web site requesting the user to pose in a certain manner while causing at least one image to be recorded of the user posing in the manner; receive the series of images recorded, either simultaneously with their recording or thereafter; provide the series of images to a moderator and at least one of the purported characteristics and/or at least one of the at least one photograph from the information about the user of the web site; receive an indication from the moderator whether the series of images of the user at least correspond to the at least one of the purported characteristics and/or the at least one of the at least one photograph provided to the moderator; and provide data for rendering to other users of the web site a human-perceptible indication that the at least one of the purported characteristics and/or at least one of the at least one photograph of the information about the user of the web site have been verified, responsive to the indication received.

The computer program product optionally includes a feature whereby at least a portion of the moderator comprises a human moderator.

The computer program product optionally includes a feature whereby the at least one of the purported characteristics and/or the at least one of the at least one photograph comprises the at least one of the purported characteristic.

The computer program product optionally includes a feature whereby the at least one of the purported characteristics and/or the at least one of the at least one photograph comprises the at least one photograph.

The computer program product optionally includes a feature whereby the at least one instruction to the user of the web site is provided in response to a request received from the user of the web site.

The computer program product optionally includes a feature whereby the at least one instruction to the user of the web site is provided in response to a request received from another user of the web site, different from the user of the web site.

The computer program product may additionally include computer readable program code devices configured to cause the computer system to: provide for display to the user of the web site, the series of images; and receive from the user an approval of the series of images; and optionally includes a feature whereby the computer readable program code devices configured to cause a computer system to provide data for rendering to other users are responsive to the approval of the series of images received.

The computer program product optionally includes a feature whereby the computer readable program code devices configured to cause the computer system to provide data for rendering to other users are responsive to an amount of time approximately between: operation of computer readable program code devices configured to cause the computer system to provide data for rendering to other users; and operation of the computer readable program code devices configured to cause the computer system to receive the series of images or operation of the computer readable program code devices configured to cause the computer system to receive the indication.

What is claimed is:

1. A method of verifying registration information, comprising:
   receiving information about a user of a web site, including purported characteristics of the user of the web site for display to other users of the web site, and/or at least one photograph purported to represent the user of the web site for display to the other users of the web site;
   providing at least one instruction to the user of the web site requesting the user to pose in a certain manner while causing at least one image to be recorded of the user posing in the certain manner;
   receiving the at least one image recorded, either simultaneously with their recording or thereafter;
   providing the at least one image to a moderator and at least one of the purported characteristics and/or at least one of the at least one photograph from the information about the user of the web site;
   receiving an indication from the moderator whether the at least one image of the user at least correspond to the at least one of the purported characteristics and/or the at least one of the at least one photograph provided to the moderator;

receiving a first request to display information about a plurality of users of the web site who meet a criteria specified as part of the request; and displaying, responsive to the indication, the information about the user as part of a response to the request.

2. The method of claim 1, additionally comprising providing data for rendering to the other users of the web site a human-perceptible indication that the at least one of the purported characteristics and/or at least one of the at least one photograph of the information about the user of the web site have been verified, responsive to the indication received.

3. The method of claim 2:
additionally comprising:
providing for display to the user of the web site, the at least one image; and
receiving from the user an approval of the at least one image; and
wherein the providing data for rendering to other users step is additionally responsive to the approval of the at least one image received.

4. The method of claim 2, wherein the providing data for rendering to the other users step is responsive to an amount of time between:
the providing data for rendering to other users step; and
the receiving the at least one image step or the receiving the indication step.

5. The method of claim 1, wherein at least a portion of the moderator comprises a human moderator.

6. The method of claim 1, wherein the at least one of the purported characteristics and/or the at least one of the at least one photograph comprises the at least one of the purported characteristics.

7. The method of claim 1, wherein the at least one of the purported characteristics and/or the at least one of the at least one photograph comprises the at least one photograph.

8. The method of claim 1, wherein the at least one instruction to the user of the web site is provided in response to a second request received from the user of the web site.

9. The method of claim 1, wherein the at least one instruction to the user of the web site is provided in response to a second request received from another user of the web site, different from the user of the web site.

10. A system of verifying registration information, comprising:
a photograph/characteristic receiver having an input for receiving information about a user of a web site, including purported characteristics of the user of the web site for display to other users of the web site, and/or at least one photograph purported to represent the user of the web site for display to other users of the web site, the photograph/characteristic receiver for providing at an output the information about the user of the web site;
an instruction manager having an output for providing at least one instruction to the user of the web site requesting the user to pose in a certain manner while causing via the instruction manager output at least one image to be recorded of the user posing in the certain manner;
a video/audio/image manager having an input for receiving the at least one image recorded, either simultaneously with their recording or thereafter, the video/audio/image manager for providing at an output the at least one image recorded;

a moderator manager having an input coupled to the video/audio/image manager for receiving the at least one image recorded, and to the photograph/characteristic receiver output for receiving the information about the user of the web site, the moderator manager for providing at an output the at least one image for display to a moderator and at least one of the purported characteristics and/or at least one of the at least one photograph from the information about the user of the web site, for receiving from the moderator at the moderator manager input an indication whether the at least one image of the user at least corresponds to the at least one of the purported characteristics and/or the at least one of the at least one photograph provided to the moderator, and for providing at the moderator manager output the indication; and a user interface manager having an input for receiving a request to display information about a plurality of users of the web site who meet a criteria specified as part of the request, and coupled to the photograph/characteristic receiver output for receiving the information about the user of the web site, the user interface manager for providing at an output for display, responsive to the indication, the information about the user as part of a response to the request.

11. The system of claim 10, additionally comprising a photograph/characteristic display manager having an input coupled to the moderator manager output for receiving the indication and to the photograph/characteristic receiver output for receiving the information about the user of the web site, the photograph/characteristic display manager for providing data for rendering to other users of the web site a human-perceptible indication that the at least one of the purported characteristics and/or the at least one of the at least one photograph from the information about the user of the web site have been verified, responsive to the indication received at the photograph/characteristic display manager input.

12. The system of claim 11 wherein:
the video/audio/image manager is additionally for:
providing via the video/audio/image manager output for display to the user of the web site, the at least one image; and
receiving from the user via the video/audio/image manager input an approval of the at least one image; and
the photograph/characteristic display manager provides data for rendering to other users responsive to the approval of the at least one image received.

13. The system of claim 11, wherein:
the moderator manager additionally provides at the moderator manager output a first identification of substantially when the indication was received and/or the video/audio/image manager additionally provides at the video/audio/image manager output a second identification of substantially when the at least one image was received;
the photograph/characteristic display manager input is additionally for receiving the first identification and/or is additionally coupled to the video/audio/image manager output for receiving the second identification;
the photograph/characteristic display manager provides the data for rendering to other users, responsive to an amount of time between:
a time or day near or when the photograph/characteristic display manager provides the data for rendering to other users; and
the first and/or second identifications.

14. The system of claim 10, wherein at least a portion of the moderator comprises a human moderator.

15. The system of claim 10, wherein the at least one of the purported characteristics and/or the at least one of the at least one photograph comprises the at least one of the purported characteristic.

16. The system of claim 10, wherein the at least one of the purported characteristics and/or the at least one of the at least one photograph comprises the at least one photograph.

17. The system of claim 10:
additionally comprising a verification request manager having an input coupled to receive a verification request from the user of the web site, the verification request manager for providing at an output a signal responsive to receipt of the verification request; and
wherein:
the instruction manager additionally comprises an input coupled to the verification request manager output for receiving the signal; and
the at least one instruction to the user of the web site is provided by the instruction manager in response to the signal received at the instruction manager input.

18. The system of claim 10:
additionally comprising a verification request manager having an input coupled to receive from another user of the web site, different from the user of the web site, a verification request specifying the user of the web site, the verification request manager for providing at an output a signal identifying the user of the web site responsive to receipt of the verification request; and
wherein:
the instruction manager additionally comprises an input coupled to the verification request manager output for receiving the signal; and
the at least one instruction to the user of the web site is provided by the instruction manager in response to the signal received at the instruction manager input.

19. A computer program product comprising a nontransitory computer useable medium having computer readable program code embodied therein for verifying registration information, the computer program product comprising computer readable program code devices configured to cause a computer system to:
receive information about a user of a web site, including purported characteristics of the user of the web site for display to other users of the web site, and/or at least one photograph purported to represent the user of the web site for display to the other users of the web site;
provide at least one instruction to the user of the web site requesting the user to pose in a certain manner while causing at least one image to be recorded of the user posing in the certain manner;
receive the at least one image recorded, either simultaneously with their recording or thereafter;
provide the at least one image to a moderator and at least one of the purported characteristics and/or at least one of the at least one photograph from the information about the user of the web site;
receive an indication from the moderator whether the at least one image of the user at least correspond to the at least one of the purported characteristics and/or the at least one of the at least one photograph provided to the moderator;
receive a first request to display information about a plurality of users of the web site who meet a criteria specified as part of the request; and
provide for display, responsive to the indication, the information about the user as part of a response to the request.

20. The computer program product of claim 19, additionally comprising computer readable program code devices configured to cause the computer system to provide data for rendering to the other users of the web site a human-perceptible indication that the at least one of the purported characteristics and/or at least one of the at least one photograph of the information about the user of the web site have been verified, responsive to the indication received.

21. The computer program product of claim 20:
additionally comprising computer readable program code devices configured to cause the computer system to:
provide for display to the user of the web site, the at least one image; and
receive from the user an approval of the at least one image; and
wherein the computer readable program code devices configured to cause a computer system to provide data for rendering to other users are additionally responsive to the approval of the at least one image received.

22. The computer program product of claim 20, wherein the computer readable program code devices configured to cause the computer system to provide data for rendering to the other users are responsive to an amount of time approximately between:
operation of computer readable program code devices configured to cause the computer system to provide data for rendering to other users; and
operation of the computer readable program code devices configured to cause the computer system to receive the at least one image or operation of the computer readable program code devices configured to cause the computer system to receive the indication.

23. The computer program product of claim 19, wherein at least a portion of the moderator comprises a human moderator.

24. The computer program product of claim 19, wherein the at least one of the purported characteristics and/or the at least one of the at least one photograph comprises the at least one of the purported characteristics.

25. The computer program product of claim 19, wherein the at least one of the purported characteristics and/or the at least one of the at least one photograph comprises the at least one photograph.

26. The computer program product of claim 19, wherein the at least one instruction to the user of the web site is provided in response to a second request received from the user of the web site.

27. The computer program product of claim 19, wherein the at least one instruction to the user of the web site is provided in response to a second request received from another user of the web site, different from the user of the web site.

* * * * *